United States Patent
Park et al.

(10) Patent No.: US 8,924,976 B2
(45) Date of Patent: Dec. 30, 2014

(54) TASK SCHEDULING METHOD AND APPARATUS

(75) Inventors: Hong Seong Park, Seoul (KR);
Limudmila Kan, Chuncheon-si (KR);
Jeong Seok Kang, Gochang-gun (KR);
Si Wan Kim, Chuncheon-si (KR)

(73) Assignee: KNU-Industry Cooperation Foundation, Chuncheon-Si (KR)

( * ) Notice: Subject to any disclaimer, the term of this patent is extended or adjusted under 35 U.S.C. 154(b) by 223 days.

(21) Appl. No.: 13/430,549

(22) Filed: Mar. 26, 2012

(65) Prior Publication Data

US 2013/0055276 A1 Feb. 28, 2013

(30) Foreign Application Priority Data

Aug. 26, 2011 (KR) .................. 10-2011-0085508
Aug. 26, 2011 (KR) .................. 10-2011-0085894

(51) Int. Cl.
*G06F 9/46* (2006.01)
*G06F 9/48* (2006.01)

(52) U.S. Cl.
CPC ................................ *G06F 9/4887* (2013.01)
USPC ........................................ 718/102; 718/100

(58) Field of Classification Search
USPC ....................................................... 718/100
See application file for complete search history.

(56) References Cited

U.S. PATENT DOCUMENTS

| | | | | |
|---|---|---|---|---|
| 6,110,220 A | * | 8/2000 | Dave et al. | 716/105 |
| 6,567,840 B1 | * | 5/2003 | Binns et al. | 718/103 |
| 7,165,252 B1 | * | 1/2007 | Xu | 718/102 |
| 7,302,685 B2 | * | 11/2007 | Binns et al. | 718/103 |
| 7,689,998 B1 | * | 3/2010 | Chrysanthakopoulos | 718/104 |
| 8,397,235 B2 | * | 3/2013 | Dong et al. | 718/100 |

FOREIGN PATENT DOCUMENTS

| | | |
|---|---|---|
| KR | 10-2001-0043794 | 5/2001 |
| KR | 10-2004-0058299 | 7/2004 |
| KR | 10-2010-0048843 | 5/2010 |
| KR | 10-2011-0061587 | 6/2011 |

OTHER PUBLICATIONS

Office Action received for Korean Patent Application No. 10-2011-0085508, mailed on Apr. 8, 2013, 4 pages.
Office Action received for Korean Patent Application No. 10-2011-0085894, mailed on Apr. 10, 2013, 4 pages.

* cited by examiner

*Primary Examiner* — Kenneth Tang
(74) *Attorney, Agent, or Firm* — Morrison & Foerster LLP

(57) ABSTRACT

A task scheduling method and apparatus are provided to execute periodic tasks together with an aperiodic real-time task in a single system, to perform scheduling while satisfying a precedence relation between periodic tasks, and to perform scheduling so that an aperiodic real-time task may be efficiently executed for a residual time left after scheduling of the periodic tasks. Additionally, a component scheduling method and apparatus in robot software are provided.

6 Claims, 16 Drawing Sheets

```
/* input : G(V,E) Task graph */
/* output : Lp Priority list (FIFS) */
Foreach ∀ τ_i ∈ G do
    If (N_i^P = 0)
        Sort, Insert τ_i in Ls in order of shortest T_i
    end
end While G = ∅ do
        First τ_k selection of Ls // shortest T_k
        Foreach ∀ τ_j ∈ E_k do
            N_i^P of τ_j is reduced
            If(N_i^P = 0 )
                Sort, Insert τ_j in Ls in order of shortest T_j
            end
        end
        Insert τ_k in Lp
        Delete τ_k from Ls
        Delete τ_k from G
end
```

1. If aperiodic task arrives at t
    1.1 Schedulability test is performed by comparing $R(t)$ and $A(t)_e$
    1.2 If schedulability test passes
        1.2.1 Highest priority is assigned to $A(t)$
        1.2.2 Periodic and aperiodic tasks are executed based on priorities after $\overline{C_j}$ of periodic task is updated
        1.2.3 Lowest priority is assigned to $A(t)$, if $\overline{C_j}$ of periodic task approaches
        1.2.4 Highest priority is re-assigned to $A(t)$, if execution of periodic task with $\overline{C_j}$ is completed
    1.3 If schedulability test fails
        1.3.1 Execution of $A(t)$ is not allowed
2. If aperiodic task does not arrive
    2.1 Periodic tasks are executed based on priorities

TASK SCHEDULING METHOD AND APPARATUS

CROSS-REFERENCE TO RELATED APPLICATIONS

This application claims the benefit of Korean Patent Application No. 10-2011-0085894 and of Korean Patent Application No. 10-2011-0085508, filed on Aug. 26, 2011, in the Korean Intellectual Property Office, the disclosures of which are incorporated herein by reference.

BACKGROUND

1. Field of the Invention

The following embodiments relate to a technology for scheduling and processing tasks in a real-time system used in a robot system, and in middleware operated in a general Operating System (OS), such as Linux, and Windows, and more particularly, to an algorithm for efficiently scheduling each of tasks based on characteristics of the tasks and processing the tasks. Additionally, the following embodiments relate to a method of enabling tasks to be executed in real time in middleware operated in a general OS.

2. Description of the Related Art

A real-time system, such as a robot system, typically processes tasks including aperiodic real-time tasks, periodic tasks, and non-real-time tasks. In particular, a periodic task may be executed based on a specific period, and may be classified into two types, namely a task that may generate data or receive data from another task, may process the data, and may transmit the processed data to the other task, and a task that may merely process data transmitted from another task.

Due to a precedence relation between periodic tasks in operations, all periodic tasks need to be executed in a period, and need to generate and use data according to set precedence constraints. Researches have been conducted on techniques of obtaining suboptimal solutions, rather than optimal solutions, using a heuristic method. Additionally, researches have been conducted on a scheduling technique of processing periodic tasks together with aperiodic real-time tasks. The aperiodic real-time tasks may be used to process an event occurring at an unspecified time, for example an alarm.

Scheduling of the real-time system may be classified into on-line scheduling and off-line scheduling, based on a point in time in which scheduling is realized. The on-line scheduling may have an advantage of flexibility, but is limited to solve a problem, such as precedence constraints between tasks, and the like.

In the off-line scheduling, operating times or priorities are assigned to periodic tasks in advance, before the system is performed. Accordingly, the off-line scheduling may not be suitable to schedule aperiodic real-time tasks occurring at an unspecified time.

Robot software components may be divided into components with only software, and components interoperating with hardware. The components may be executed by scheduling, to control a robot. In a robot system, components need to be executed periodically or in real-time, in the same manner as the above-described tasks. Specifically, since the robot system is operated in real time, a real-time OS may be applied to the robot system without any problem. However, when is used together with an OS and when component tasks are executed in the middleware, a problem may occur. In particular, when a general OS is applied to the robot system, a serious problem may occur, for example periodic execution may disappear. Since the middleware controls component tasks, despite the real-time OS being used, a similar problem may occur.

SUMMARY

An aspect of the present invention provides a task scheduling method and apparatus that may execute both a periodic task and an aperiodic real-time task in a single system. The system may include, for example, a robot system operated in a real-time Operating System (OS), a robot system to execute tasks based on middleware in a real-time OS, and a robot system to execute tasks based on middleware in a general OS.

Another aspect of the present invention provides a task scheduling method and apparatus that may perform scheduling while specifying a precedence relation between periodic tasks, and may perform scheduling so that an aperiodic real-time task may be executed for a residual time left after scheduling of the periodic tasks.

Still another aspect of the present invention provides a component task scheduling method and apparatus that may schedule components in robot software based on delta times of the components and a precedence relation between the components. The components may be identified based on time periods and the precedence relation. For example, in a robot, a general OS, such as Linux and Windows, as well as a real-time OS, are often used, and middleware is often used to increase recyclability of components in an OS. In the middleware, it is difficult to control component tasks in real time due to a difficulty in controlling a time. Accordingly, there is provided a technology that may use a period of component tasks and a reliable timer interval provided by an OS so that the general OS and middleware may be easily used in the robot system.

In the middleware, it is difficult to control component tasks in real time due to a difficulty in control of time. Accordingly, there is provided a technology that may use a period of component tasks and a reliable timer interval provided by an OS so that According to an aspect of the present invention, there is provided a method of performing a task scheduling algorithm in a robot system used to execute a plurality of periodic tasks and at least one aperiodic real-time task, the method including: scheduling the periodic tasks based on a precedence relation between the periodic tasks; and scheduling the aperiodic real-time task for a residual time, when a request to schedule the aperiodic real-time task is received from the system, the residual time being left after the scheduling of the periodic tasks.

The scheduling of the periodic tasks may include preferentially scheduling a periodic task with a small indegree in a graph structure among the periodic tasks, based on a period and an execution order of each of the periodic tasks.

The scheduling of the periodic tasks may include repeatedly deleting periodic tasks corresponding to vertices with an indegree of 0 in the graph structure, from among the periodic tasks, topologically sorting the deleted periodic tasks in an order in which the periodic tasks are deleted, and assigning priorities to the periodic tasks, and scheduling the periodic tasks based on the assigned priorities.

The repeatedly deleting may include, when a plurality of periodic tasks correspond to the vertices with the indegree of 0, comparing periods of the plurality of periodic tasks, and deleting a periodic task with a shorter period than the other periods, based on a result of the comparing.

The method may further include allowing an execution of the aperiodic real-time task requested to be scheduled, depending on whether the residual time is longer than an execution time of the aperiodic real-time task.

The method may further include assigning a highest priority to the aperiodic real-time task, when the execution of the aperiodic real-time task is allowed, updating critical times of the periodic tasks, and when a critical time of a periodic task among the periodic tasks is approaching due to the updating, executing the periodic task earlier than the aperiodic real-time task.

The executing of the periodic task may include assigning a lowest priority to the aperiodic real-time task, executing the periodic task, and re-assigning the highest priority to the aperiodic real-time task, when the executing of the periodic task is completed.

According to another aspect of the present invention, there is provided a scheduling apparatus in a system used to execute a plurality of periodic tasks and at least one aperiodic real-time task, the scheduling apparatus including: a periodic task scheduler to schedule the periodic tasks based on a precedence relation between the periodic tasks; a scheduling request receiver to receive, from the system, a request to schedule the aperiodic real-time task; and an aperiodic real-time task scheduler to schedule the aperiodic real-time task for a residual time left after the scheduling of the periodic tasks.

The periodic task scheduler may preferentially schedule a periodic task with a small indegree in a graph structure among the periodic tasks, based on a period and an execution order of each of the periodic tasks.

The periodic task scheduler may repeatedly delete periodic tasks corresponding to vertices with an indegree of 0 in the graph structure, from among the periodic tasks, may topologically sort the deleted periodic tasks in an order in which the periodic tasks are deleted, may assign priorities to the periodic tasks, and may schedule the periodic tasks based on the assigned priorities.

When a plurality of periodic tasks correspond to the vertices with the indegree of 0, the periodic task scheduler may compare periods of the plurality of periodic tasks, and may delete a periodic task with a shorter period than the other periods, based on a result of the comparing.

The aperiodic real-time task scheduler may determine whether the residual time is longer than an execution time of the aperiodic real-time task requested to be scheduled. When the residual time is determined to be longer than the execution time, the aperiodic real-time task scheduler may allow an execution of the aperiodic real-time task.

When the execution of the aperiodic real-time task is allowed, the aperiodic real-time task scheduler may assign a highest priority to the aperiodic real-time task. Additionally, the aperiodic real-time task scheduler may update critical times of the periodic tasks. When a critical time of a periodic task among the periodic tasks is approaching due to the updating, the aperiodic real-time task scheduler may execute the periodic task earlier than the aperiodic real-time task.

To execute the periodic task earlier than the aperiodic real-time task, the aperiodic real-time task scheduler may assign a lowest priority to the aperiodic real-time task, may execute the periodic task. When the executing of the periodic task is completed, the aperiodic real-time task scheduler may re-assign the highest priority to the aperiodic real-time task.

According to still another aspect of the present invention, there is provided a scheduling algorithm used in a robot system used to execute a plurality of periodic tasks and at least one aperiodic real-time task, the scheduling algorithm including: a periodic task scheduling algorithm to schedule the periodic tasks based on a precedence relation between the periodic tasks; and an aperiodic real-time task scheduling algorithm to schedule the aperiodic real-time task for a residual time, when a request to schedule the aperiodic real-time task is received from the system, the residual time being left after the scheduling of the periodic tasks.

According to yet another aspect of the present invention, there is provided a component task scheduling method used in a robot system, including: determining a timer time for scheduling, based on periods of a plurality of periodic tasks, and a period of a reliable timer interrupt provided by an OS, the timer time being used in middleware or a general OS; adjusting an interval of a timer interrupt to prevent an error in the timer time from being accumulated over time; receiving a plurality of components, the components being identified by a time period and a precedence relation; calculating a delta time of each of the components, using the time period; assigning the components to an execution queue, using the delta time and a priority based on the precedence relation; and executing at least one of the components assigned to the execution queue. The priority may be determined using the above-described algorithm using the precedence relation. In other words, when the priority is determined using the above-described algorithm associated with periodic tasks and aperiodic tasks, the component task scheduling method may be used based on the above aspect.

The component scheduling method may further include assigning, to a finish queue, at least one component that is completely executed using the execution queue, comparing a time period of the component assigned to the finish queue, with a delta time of a component assigned to the execution queue, and re-assigning, to the execution queue, the component assigned to the finish queue, based on a result of the comparing.

The re-assigning may include re-assigning, to the execution queue, a component with a time period equal to or less than the delta time of the component assigned to the execution queue, among components assigned to the finish queue.

The comparing may include comparing the time period of the component assigned to the finish queue, with the delta time of the component assigned to the execution queue, based on priorities of components assigned to the finish queue.

The executing may include executing the at least one component during a predetermined time slot, based on the delta time.

The executing may include executing the at least one component based on the priority based on the precedence relation.

The calculating may include calculating a delta time of a component corresponding to a current ranking, based on a time period of the component corresponding to the current ranking, and based on a delta time of a component corresponding to a previous ranking.

According to a further aspect of the present invention, there is provided a component scheduling apparatus, including: a component receiving unit to receive a plurality of components, the components being identified by a time period and a precedence relation; a delta time calculating unit to calculate a delta time of each of the components, using the time period; a component assigning unit to assign the components to an execution queue, using the delta time and a priority based on the precedence relation; and a component executing unit to execute at least one of the components assigned to the execution queue.

The component scheduling apparatus may further include a component re-assigning unit to compare a time period of the component assigned to the finish queue, with a delta time of a component assigned to the execution queue, and to re-assign, to the execution queue, the component assigned to the finish queue, based on a result of the comparing.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 3 is a diagram illustrating a priority assignment algorithm for assigning priorities to periodic tasks in a scheduling algorithm according to an embodiment of the present invention;

FIG. 8 is a diagram briefly illustrating an operation of an aperiodic real-time task scheduler in the scheduling apparatus of FIG. 6;

DETAILED DESCRIPTION

Figure 1:
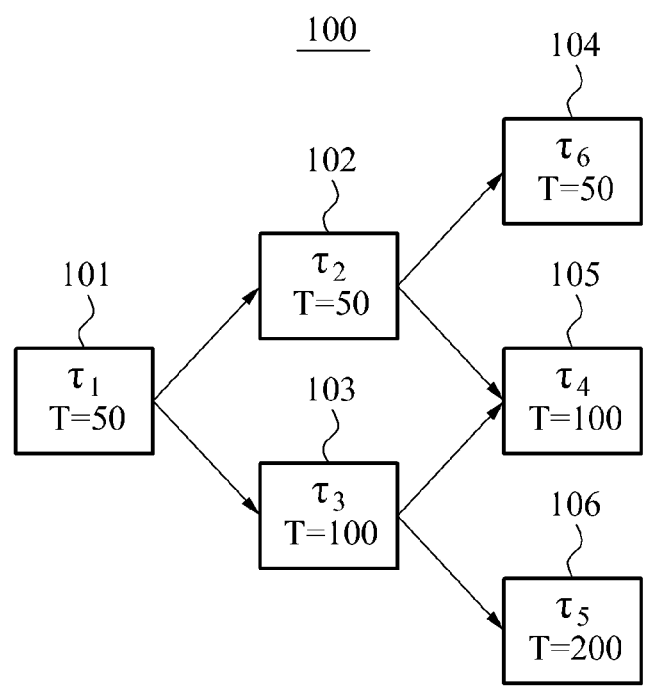
FIG. 1 is a diagram illustrating a precedence relation between periodic tasks in a scheduling algorithm according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A scheduling algorithm according to embodiments of the present invention may provide an off-line scheduling scheme for periodic tasks, and an on-line scheduling scheme for aperiodic real-time tasks.

The off-line scheduling scheme may be used to schedule periodic tasks by considering a precedence relation between the periodic tasks according to priorities offline, based on periods of the periodic tasks and a topological sort of the periodic tasks. The on-line scheduling scheme may be used to determine whether to allow execution of an aperiodic real-time task, based on a residual time, and to assign priorities. The residual time may refer to an amount of time left after the periodic tasks are scheduled by the off-line scheduling scheme.

Additionally, in the scheduling algorithm, periodic tasks with the same period may be represented as a single set. In addition, the scheduling algorithm may compute a residual time of a periodic task, by dynamically updating parameters of a periodic task set, instead of using a Slack Check Table (SCT). In this instance, the parameters may include, for example, a period, an execution time, an occurrence frequency, and the like. Accordingly, in the present invention, it is possible to reduce memory waste due to generation of the slack table, and to reduce a computation amount using the periodic task set.

The scheduling algorithm may satisfy a fast response time of an aperiodic real-time task, using a critical time of a task.

A system model of the scheduling algorithm may be implemented below. In the system model, characteristics of a periodic task $\tau_i$ may be represented based on elements of $\{e_i, T_i, p_i, E_i, N_i^p\}$ according to an embodiment of the present invention. In this instance, $e_i$ denotes an execution time of the periodic task $\tau_i$, $T_i$ denotes a period of the periodic task $\tau_i$, $p_i$ denotes a priority of the periodic task $\tau_i$, $E_i$ denotes edges connected to a task that consumes data produced by the periodic task $\tau_i$, and $N_i^p$ denotes a set of producer tasks that produce data used by the periodic task $\tau_i$.

The periodic task set and the precedence relation between the periodic tasks may have a characteristic of a Directed Acyclic Graph (DAG), and may be represented, for example, by G(V, E). In this instance, V denotes a set of all periodic tasks $\tau_i$ in a system, and E denotes a set of all edges $E_i$ in the system.

FIG. 1 is a diagram illustrating a precedence relation between periodic tasks in a scheduling algorithm according to an embodiment of the present invention. The periodic tasks may include a plurality of producer tasks, and a plurality of consumer tasks. The consumer tasks may be executed after a producer task of each of the consumer tasks is executed based on the precedence relation. When a producer task is not executed, a corresponding consumer task may not be executed.

For example, referring to FIG. 1, a consumer task $\tau_4$ 105 may be executed, when both producer tasks $\tau_2$ 102 and $\tau_3$ 103 of the consumer task $\tau_4$ 105 are executed.

In the above relationship between a producer and a consumer, to satisfy synchronization constraints for sampling of periodic tasks, a period of each of periodic tasks may be assigned to have a harmonic relationship. In this instance, the synchronization constraints may refer to constraints that a consumer task needs to use data of a producer task in a period of the consumer task. Accordingly, the scheduling algorithm may set the period of the consumer task to be an integer multiple of a period of the producer task, and may enable the consumer task to use a larger number of data of the producer task that is produced in the period of the consumer task.

In the system model of the present invention, an aperiodic real-time task occurring at an unspecified time t may be represented by A(t). Additionally, in the system model, an aperiodic real-time task with an execution time may be represented by $A_e(t)$, and an aperiodic real-time task with a priority may be represented by $A_p(t)$. The aperiodic real-time task used in the present invention may not occur together with another aperiodic real-time task, and may be assumed to be processed after a previous aperiodic real-time task is completely executed.

The off-line scheduling scheme provided by the scheduling algorithm may be performed based on a topological sort. The topological sort refers to ordering of all vertices in a graph, without violating a precedence relation between the vertices.

In general, an algorithm associated with the topological sort may select a vertex with an indegree of 0, and may delete all edges connected to the selected vertex. Additionally, the algorithm associated with the topological sort may repeat the selecting and deleting, and may be terminated when all vertices are selected and edges of the vertices are deleted. In the algorithm associated with the topological sort, the topological sort may be performed in an order in which edges are deleted. The scheduling algorithm according to embodiments of the present invention may use an adjacent list to use the topological sort.

1. Periodic Task Scheduling Algorithm

Figure 2:
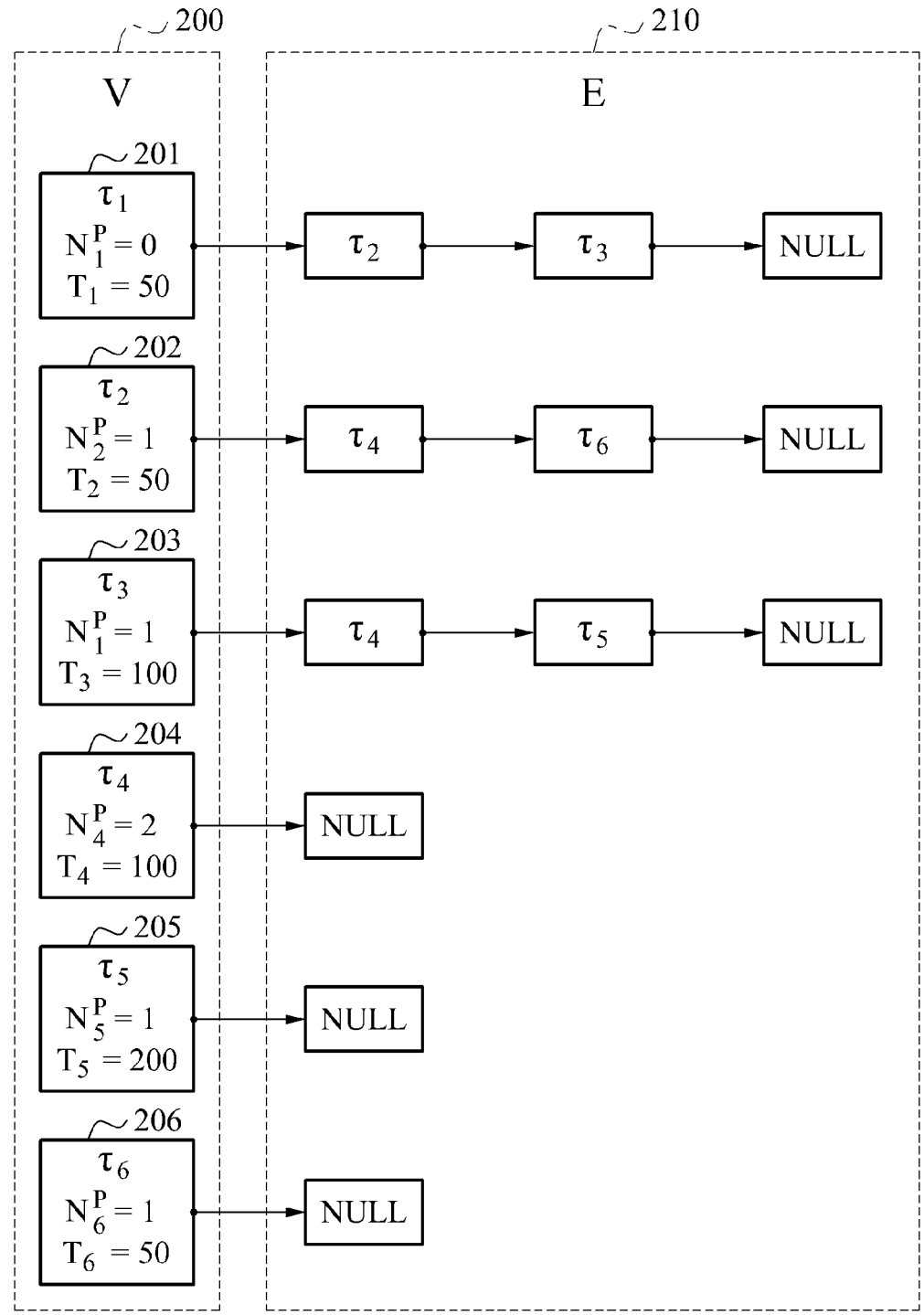
FIG. 2 is a diagram illustrating an example of a graph of periodic tasks based on an adjacent list in a scheduling algorithm according to an embodiment of the present invention.

FIG. 2 is a diagram illustrating an example of a graph of periodic tasks based on an adjacent list in a scheduling algorithm according to an embodiment of the present invention.

Referring to FIG. 2, each of periodic tasks 201 to 206 may have, as an adjacent node, an address for a consumer task that uses data of each of the periodic tasks 201 to 206. And each of periodic tasks 201 to 206 may have their indegree as elements. Their indegree may have a number of producer tasks and a period of producer tasks.

For example, a periodic task $\tau_1$ may have, as adjacent nodes, addresses for consumer tasks $\tau_2$ and $\tau_3$, and may have, as elements, an indegree $N_1^P$ of 0, and a period $T_1$ of 50.

A typical topological sort algorithm may be used in a periodic task graph, and comparing periods of periodic tasks with an indegree (namely, the number of producer tasks) of 0 may be further performed when selecting the periodic tasks.

FIG. 3 is a diagram illustrating a priority assignment algorithm for assigning priorities to periodic tasks in a scheduling algorithm according to an embodiment of the present invention. In this embodiment, the periodic tasks may be stored in a First-In-First-Served (FIFS) queue.

In the priority assignment algorithm of FIG. 3, Ls denotes a list used to compare periods of periodic tasks with an indegree of 0, and Lp denotes a list in which periodic tasks are stored.

By the priority assignment algorithm of FIG. 3, periodic tasks may be sorted in an order from a shortest period to a longest period, priorities may be respectively assigned to the sorted periodic tasks, and the periodic tasks with the priorities may be stored in the FIFS queue.

Figure 4:
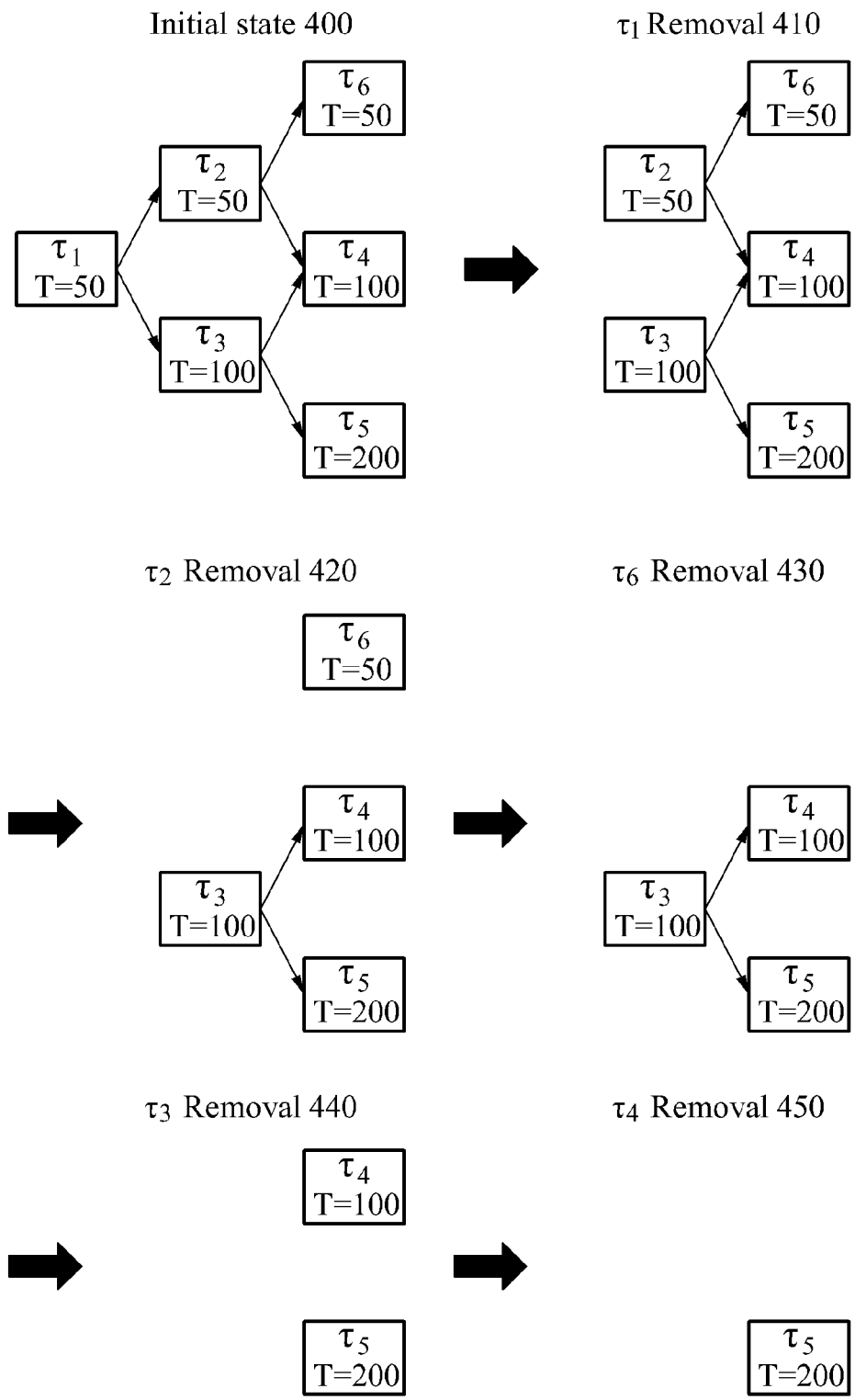
FIG. 4 is a diagram illustrating an operation of assigning priorities by the priority assignment algorithm of FIG. 3.

FIG. 4 is a diagram illustrating an operation of assigning priorities by the priority assignment algorithm of FIG. 3.

Referring to FIG. 4, a topological sort-based priority assignment algorithm of a scheduling algorithm according to an embodiment of the present invention may be performed based on Table 1 below and accordingly, the priority assignment algorithm of FIG. 3 may assign priorities to periodic tasks.

TABLE 1

| Task | $e_i$ | $T_i$ | $E_i$ | $N_i^P$ | $p_i$ |
|---|---|---|---|---|---|
| $\tau_1$ | 10 | 50 | $\tau_2, \tau_3$ | 0 | — |
| $\tau_2$ | 10 | 50 | $\tau_4, \tau_6$ | 1 | — |
| $\tau_3$ | 10 | 100 | $\tau_4, \tau_5$ | 1 | — |
| $\tau_4$ | 10 | 100 | — | 2 | — |
| $\tau_5$ | 20 | 200 | — | 1 | — |
| $\tau_6$ | 5 | 50 | — | 1 | — |

First, the topological sort-based priority assignment algorithm may sequentially delete vertices with an indegree of 0 from periodic tasks in a graph representing an initial state 400 of FIG. 4. Accordingly, the initial state 400 may be changed to a state 410 in which $\tau_1$ is removed, a state 420 in which $\tau_2$ is removed, a state 430 in which $\tau_6$ is removed, a state 440 in which $\tau_3$ is removed, a state 450 in which $\tau_4$ is removed, and the like.

The priority assignment algorithm may assign priorities to periodic tasks in an order in which the periodic tasks are deleted. As a result, tasks to which priorities are assigned may be shown in Table 2 below.

TABLE 2

| Task | $e_i$ | $T_i$ | $p_i$ |
|---|---|---|---|
| $\tau_1$ | 10 | 50 | 1 |
| $\tau_2$ | 10 | 50 | 2 |
| $\tau_3$ | 10 | 100 | 4 |
| $\tau_4$ | 10 | 100 | 5 |
| $\tau_5$ | 20 | 200 | 6 |
| $\tau_6$ | 5 | 50 | 3 |

As shown in Table 2, priorities $p_i$ may be assigned in an order in which the periodic tasks are removed as shown in FIG. 4.

Figure 5:
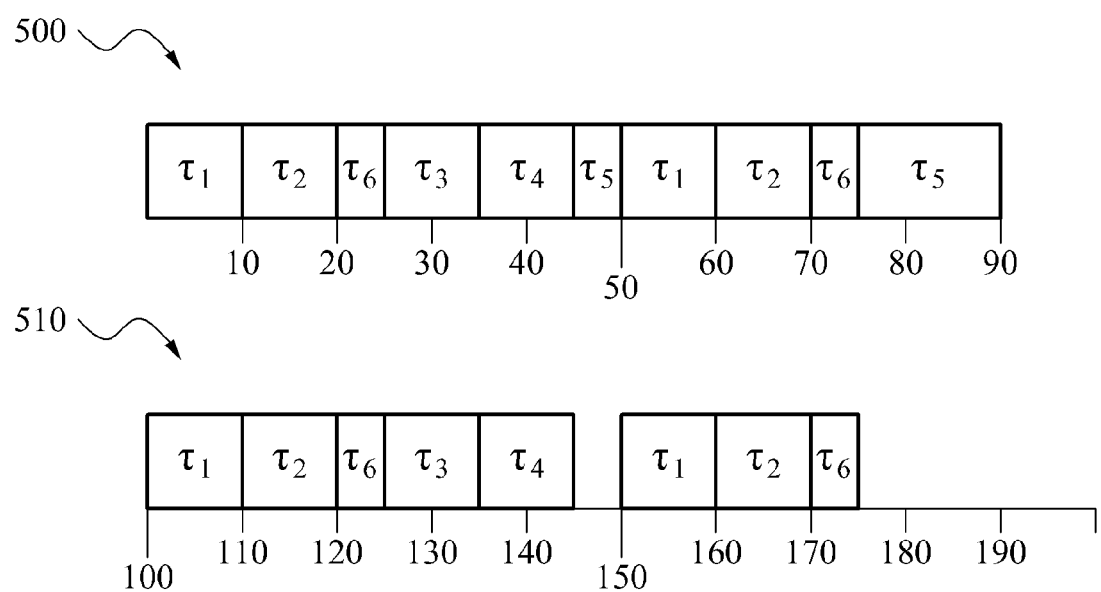
FIG. 5 is a diagram illustrating an example of a scheduling result by a topological sort-based priority assignment algorithm in a scheduling algorithm according to an embodiment of the present invention.

FIG. 5 is a diagram illustrating an example of a scheduling result by a topological sort-based priority assignment algorithm in a scheduling algorithm according to an embodiment of the present invention.

Referring to FIG. 5, periodic tasks may be executed based on priorities assigned by the scheduling algorithm, without violating periods of the periodic tasks, respectively. In particular, periodic tasks may be executed while satisfying a precedence relation between the periodic tasks, even when a start time is not set as indicated by reference numeral 500, or even when different start times are set as indicated by reference numeral 510.

2. Aperiodic Real-Time Task Scheduling Algorithm

The scheduling algorithm according to embodiments of the present invention may schedule aperiodic real-time tasks arriving online, based on priorities assigned to periodic tasks by the above-described topological sort-based priority assignment algorithm. In scheduling of an aperiodic real-time task, a hyper period of a periodic task may be computed first, and an execution of the aperiodic real-time task may be allowed and controlled, for a residual time left after periodic tasks are executed within the computed hyper period.

Additionally, to minimize a response time of an aperiodic real-time task, the aperiodic real-time task scheduling algorithm may assign a highest priority to the aperiodic real-time task until a periodic task in a critical time does not exist.

The hyper period may be a least common multiple of all periodic tasks included in a system of the present invention. In particular, the hyper period may be represented by the following Equation 1:

$$H = LCM\{T_1, T_2, \ldots, T_n\} \qquad \text{[Equation 1]}$$

In Equation 1, H denotes a hyper period, and $\{T_1, T_2, \ldots, T_n\}$ denote periods of periodic tasks.

In the topological sort-based priority assignment algorithm, periodic tasks may be sorted in the order of sizes of periods, as described above. Accordingly, periodic tasks with the same period may be consecutively executed.

Accordingly, the periodic tasks with the same period may be defined to be a single group, and thus it is possible to save a calculation time prior to execution of the periodic tasks. In the present invention, periodic tasks with the same period may be denoted by Sj (or Sk). The periodic tasks Sj with the same period may have elements based on $\{T_j^S, N_j, e_j^S, P_j, C_j, \overline{C_j}\}$. The elements may be denoted by Xj, and X may represent elements of $\{T_j^S, N_j, e_j^S, P_j, C_j, \overline{C_j}\}$.

$T_j^S$ denotes a period of each of the periodic tasks Sj. Nj denotes a number of times the periodic tasks Sj occur within the hyper period H, and may be calculated by the following Equation 3:

$$N_j(t) = \frac{H}{T_j^s} - \left\lfloor \frac{t - t_s}{T_j^s} \right\rfloor \quad \text{[Equation 3]}$$

In Equation 3, $t_S$ denotes a start time of a hyper period. Nj may be reduced by 1, when the periods of the periodic tasks Sj end. Additionally, $e_j^S$ denotes a sum of execution times of the periodic tasks Sj, and may be calculated by the following Equation 4:

$$e_j^s = \sum_{\forall \tau_i \in S_j} e_i \quad \text{[Equation 4]}$$

In addition, Pj denotes a time in which the periodic tasks Sj are executed up to a current time, and may be calculated by the following Equation 5:

$$P_j(t) = \sum_{\forall \tau_i \in S_j} e_i(t) \quad \text{[Equation 5]}$$

In Equation 5, $e_i(t)$ denotes an execution time from a period start time of each of the periodic tasks Sj to t.

Additionally, a critical time Cj indicates a value from a start of the periods of the periodic tasks Sj to an initial critical time. In this instance, the critical time may refer to a boundary time enabling a periodic task to be executed while satisfying a period of the periodic task. For example, when a periodic task exceeds a critical time of the periodic task, the periodic task may be beyond a period of the periodic task.

The critical time Cj may be computed in the same manner in which an idle time table is generated in an EDL (Earliest Deadline as Late as possible) algorithm. In particular, $\overline{C_j}$ denotes a critical time that is re-computed when an aperiodic real-time task arrives online, or when a preemption occurs by a periodic task with a higher priority. When the aperiodic real-time task does not arrive, or when the preemption does not occur, $\overline{C_j}$ may be equal to Cj. Accordingly, when an aperiodic real-time task arrives at a time t, or when a preemption occurs by a periodic task with a higher priority, $\overline{C_j}$ may be updated using the following Equation 6:

$$\overline{C_j}(t) = t_S + C_j \quad \text{[Equation 6]}$$

When $\overline{C_j}$ is updated, $\overline{C_j}$ of Sk that is earlier than Cj needs to be updated again, using the following Equation 7:

$$\overline{C_k}(t) = \overline{C_k} + P_j(t) \text{ (for } S_k \text{ in which } \overline{C_k} < \overline{C_j}) \quad \text{[Equation 7]}$$

To verify allowing of execution of the aperiodic real-time task arriving at the time t, the aperiodic real-time task scheduling algorithm may compute a residual time left after a periodic task is executed at the time t. In this instance, the residual time may be represented by R(t), and the aperiodic real-time task scheduling algorithm may obtain the residual time R(t) using the following Equation 8:

$$R(t) = H - t - \sum_{\forall S_j} \{(e_j^s \times N_j) - P_j\} \quad \text{[Equation 8]}$$

Additionally, the aperiodic real-time task scheduling algorithm may determine whether to execute an aperiodic real-time task A(t) arriving at the time t, based on a condition of Equation 9 below. In other words, the aperiodic real-time task scheduling algorithm may selectively execute the aperiodic real-time task A(t) arriving online, depending on whether the condition of Equation 9 is satisfied.

$$R(t) \geq A(t)_e \quad \text{[Equation 9]}$$

Figure 6:
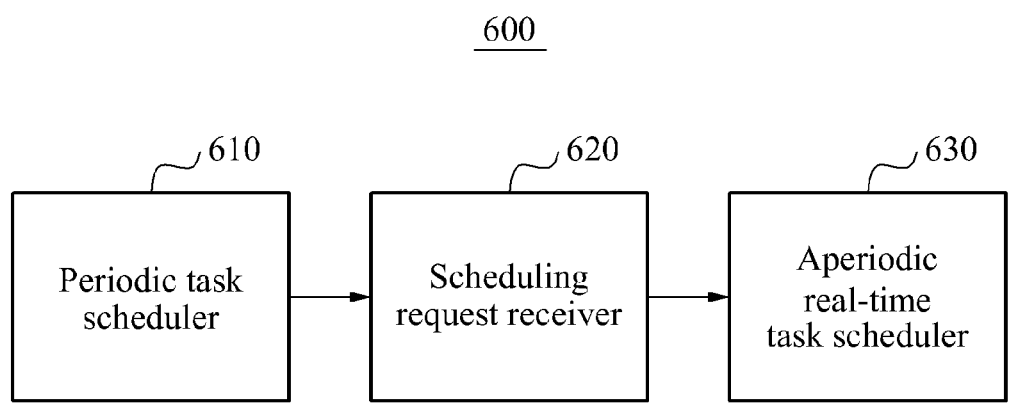
FIG. 6 is a block diagram illustrating a configuration of a scheduling apparatus for performing a scheduling method according to another embodiment of the present invention.
Figure 7:
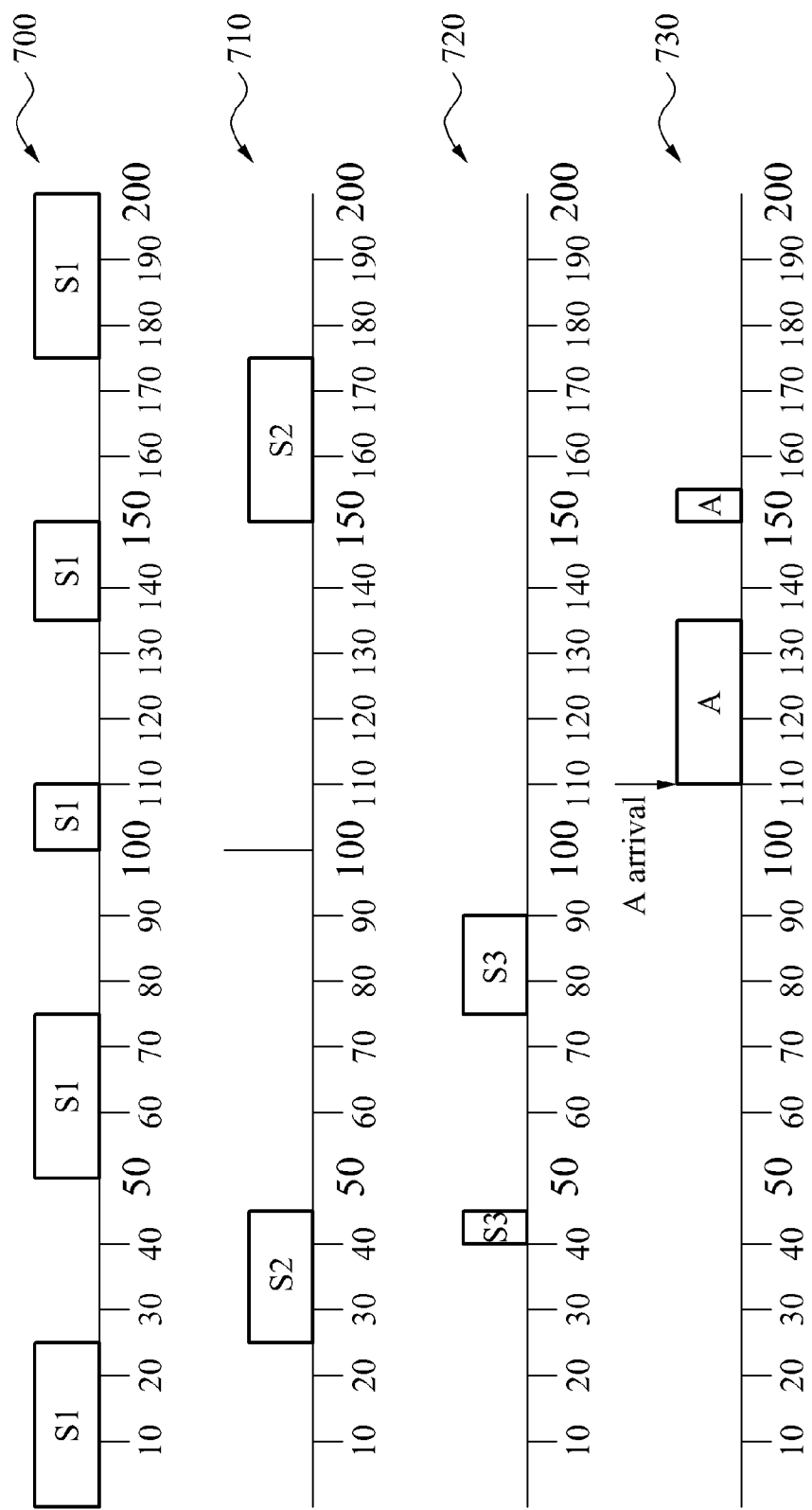
FIG. 7 is a diagram illustrating an example of a scheduling result obtained by the scheduling apparatus of FIG. 6.

FIG. 6 is a block diagram illustrating a configuration of a scheduling apparatus 600 for performing a scheduling method according to another embodiment of the present invention. FIG. 7 is a diagram illustrating an example of a scheduling result obtained by the scheduling apparatus 600. The scheduling apparatus 600 may be used for a system used to execute a plurality of periodic tasks and at least one aperiodic real-time task.

Referring to FIG. 6, the scheduling apparatus 600 may include a periodic task scheduler 610, a scheduling request receiver 620, and an aperiodic real-time task scheduler 630.

The periodic task scheduler 610 may schedule the plurality of periodic tasks, based on a precedence relation between the periodic tasks. Specifically, the periodic task scheduler 610 may schedule the periodic tasks, based on the above-described topological sort-based priority assignment algorithm.

The scheduling request receiver 620 may receive, from the system, a scheduling request to schedule the aperiodic real-time task.

The aperiodic real-time task scheduler 630 may schedule the at least one aperiodic real-time task, for a residual time left after the plurality of periodic tasks are scheduled.

The aperiodic real-time task scheduler 630 may schedule the aperiodic real-time task in response to the scheduling request from the system, based on the above-described aperiodic real-time task scheduling algorithm.

An operation of the aperiodic real-time task scheduler 630 may be simplified as shown in FIG. 8. Referring to FIG. 8, data 800 may simply show the aperiodic real-time task scheduling algorithm.

In FIG. 8, an arrival of an aperiodic real-time task at a time t may indicate that the scheduling request receiver 620 receives the scheduling request from the system at the time t. Additionally, non-arrival of the aperiodic real-time task at the time t may indicate that the scheduling request receiver 620 does not receive the scheduling request.

In other words, when the aperiodic real-time task arrives at the time t, the aperiodic real-time task scheduler 630 may schedule the aperiodic real-time task based on the aperiodic real-time task scheduling algorithm.

More specifically, the aperiodic real-time task scheduler 630 may perform a schedulability test on the aperiodic real-time task requested to be scheduled, using the condition of Equation 9. In other words, the aperiodic real-time task scheduler 630 may determine whether to execute the aperiodic real-time task, depending on whether the condition of Equation 9 is satisfied.

For example, when the condition of Equation 9 is not satisfied, the aperiodic real-time task scheduler 630 may not allow execution of the aperiodic real-time task A(t). Conversely, when the condition of Equation 9 is satisfied, the aperiodic real-time task scheduler 630 may allow the execution of the aperiodic real-time task A(t).

When the execution of the aperiodic real-time task A(t) is allowed, that is, when the schedulability test passes, the aperiodic real-time task scheduler 630 may assign a highest priority to the aperiodic real-time task A(t), and may enable a response time of the aperiodic real-time task A(t) to be fast.

Additionally, the aperiodic real-time task scheduler 630 may update $\overline{C_j}$ of a periodic task, and may execute periodic and aperiodic tasks based on priorities.

Furthermore, when $\overline{C_j}$ of the periodic task approaches, the aperiodic real-time task scheduler 630 may assign a lowest priority to the aperiodic real-time task A(t), in order to execute the periodic task prior to the other periodic tasks. In addition, when execution of the periodic task is completed, the aperiodic real-time task scheduler 630 may re-assign the highest priority to the aperiodic real-time task A(t).

In other words, when a critical time of a periodic task approaches, the aperiodic real-time task scheduler 630 may set a lowest priority to an aperiodic real-time task, and may postpone execution of the aperiodic real-time task until the periodic task is completely executed.

When task groups $G_1=\{\tau_1,\tau_2,\tau_6\}$, $G_2=\{\tau_3,\tau_4\}$, $G_3=\{\tau_5\}$ at a time 110 are used using tasks of Table 2, a task set may be obtained as shown in the following Table 3:

TABLE 3

| Task Set ID(s) | $T^s$ | N | $e^s$ | P | C | $\overline{C}$ |
|---|---|---|---|---|---|---|
| 1 | 50 | 2 | 25 | 10 | 25 | 125 |
| 2 | 100 | 1 | 20 | 0 | 55 | 155 |
| 3 | 200 | 0 | 20 | 0 | — | — |

For example, when an aperiodic real-time task A with an execution time of 30 arrives at the time 110, R(t) of 30 may be obtained. Since the execution time of the aperiodic real-time task A is equal to R(t), scheduling of the aperiodic real-time task A may be enabled. Accordingly, a value of S1 may be updated to 135, as shown in Table 4, and on-line scheduling may be performed.

TABLE 4

| Task Set ID(s) | $T^s$ | N | $e^s$ | P | C | $\overline{C}$ |
|---|---|---|---|---|---|---|
| 1 | 50 | 2 | 25 | 10 | 25 | 135 |
| 2 | 100 | 1 | 20 | 0 | 55 | 155 |
| 3 | 200 | 0 | 20 | 0 | — | — |

Referring to FIG. 7, at a time 135, a lowest priority may be assigned to the aperiodic real-time task A, to guarantee periods of periodic tasks $\tau_2$ and $\tau_3$ in a group S1 in which a critical time approaches. Accordingly, execution of the real-time aperiodic task A may be postponed, and the periodic tasks $\tau_2$ and $\tau_3$ may be executed. Subsequently, the aperiodic real-time task A may be executed for a residual time left after the periodic tasks $\tau_2$ and $\tau_3$ are executed.

Figure 9:
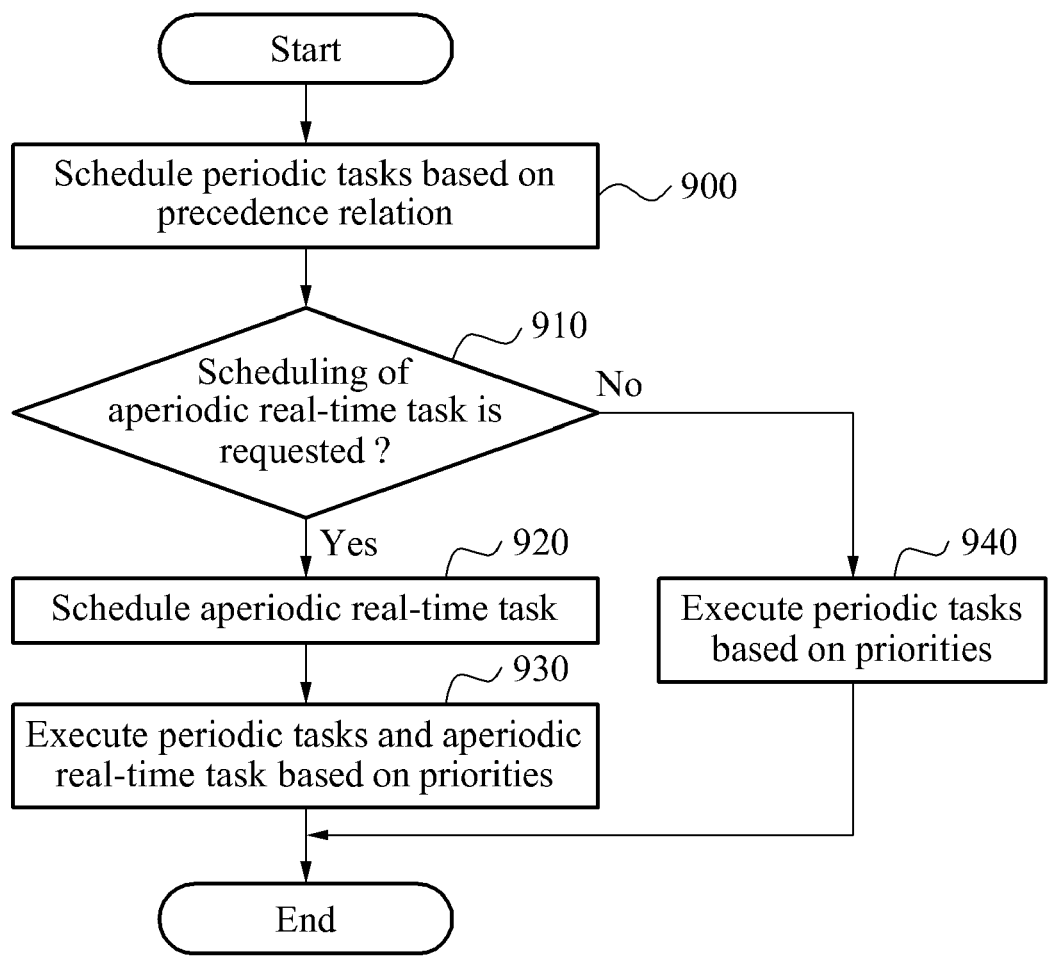
FIG. 9 is a flowchart illustrating a method of performing a scheduling algorithm according to still another embodiment of the present invention.

FIG. 9 is a flowchart illustrating a method of performing a scheduling algorithm according to still another embodiment of the present invention.

Referring to FIG. 9, in operation 900, a plurality of periodic tasks may be scheduled based on a precedence relation between the periodic tasks. In operation 910, whether scheduling of at least one aperiodic real-time task is requested by a system used to execute the periodic tasks and aperiodic real-time task may be determined.

As a result of operation 910, when the scheduling of the aperiodic real-time task is requested by the system, the aperiodic real-time task may be scheduled for a residual time in operation 920. The residual time may refer to an amount of time left after the periodic tasks are scheduled.

In operation 930, the scheduled periodic tasks and the scheduled aperiodic real-time task may be executed based on priorities.

When the scheduling of the aperiodic real-time task is not requested by the system in operation 910, the periodic tasks scheduled in operation 900 may be executed based on the priorities of the periodic tasks in operation 940.

According to embodiments of the present invention, a task scheduling method and apparatus may be provided to improve performance of a robot system, by reducing an overhead and jitter, and by increasing accuracy of time, in middleware operated in a real-time Operating System (OS), in a general OS, such as Linux and Windows, and in middleware operated in the general OS. Additionally, a task scheduling method and apparatus may also be provided to enable dynamic scheduling in real-time even using an OS, for example Windows XP, that is typically used in a Personal Computer (PC), a notebook computer, and the like.

The task scheduling method and apparatus may be implemented by a robot software component scheduling method and apparatus.

The above-described task scheduling method may be used in assigning of a priority.

Figure 10:
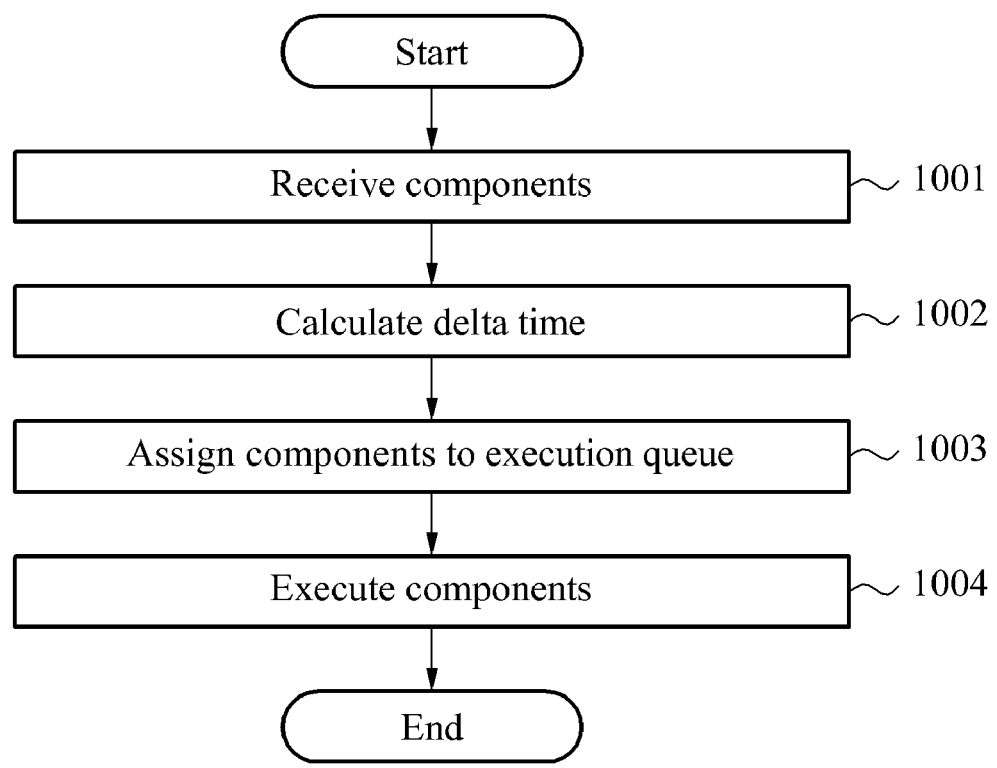
FIG. 10 is a flowchart illustrating a component scheduling method performed by a component scheduling apparatus according to yet another embodiment of the present invention.

Prior to describing a method of FIG. 10, a timer time in an OS may be indicated by $T_{int}$, and $c_{nt}$ entering a single delta time may be determined using the timer time $T_{int}$ and a delta time of a component. Additionally, a reliable timer time refers to a timer in which a time interval is generated with little error. For example, the delta time may be determined to be a greatest common divisor of all components. The determined delta time may need to be equal to or greater than the timer time $T_{int}$, in order to reduce a time error and jitters caused by accumulation of timer interrupts occurring at intervals of the timer time $T_{int}$. In general, a timer interrupt used in a real-time OS occurs at exact time intervals, whereas a timer interrupt used in a general OS occurs at irregular time intervals as the time interval becomes narrower. Accordingly, the timer time $T_{int}$ needs to be set, and whether the delta time is obtained from the timer time $T_{int}$ may be determined. For example, when the delta time is less than the timer time $T_{int}$, there is a need to control the delta time to be greater than the timer time $T_{int}$, by adjusting a period of a component. Additionally, when the delta time is equal to the timer time $T_{int}$, or is less than double the timer time $T_{int}$, there is a need to determine whether to use the delta time based on an occurrence time accumulation error of the timer time $T_{int}$. When there is little occurrence time accumulation error, the timer time $T_{int}$ may be used without a change. However, when the occurrence time accumulation error is increased, and when the timer time $T_{int}$ is used without a change, a large number of periods may be excluded over time. When the delta time is equal to the timer time $T_{int}$, or is less than double the timer time $T_{int}$, the timer time $T_{int}$ may be set to the delta time and may be operated using a reliable timer. However, when even the reliable timer is used without a correction for a long period of time, the same situation may occur.

Accordingly, there is a need for a method of correcting a time error to reduce an accumulation error $T_{diff}$ that enables periodic executions to be excluded. Here, even a timer with a time error may be used, however, in a timer in which an extremely large number of errors occur, an accumulation error may be corrected as a number $N_{int}$ of the timer time $T_{int}$ included in the delta time is increased. The delta time may be obtained by multiplying $N_{int}$ by $T_{int}$ in which $N_{int}$ is an integer. For example, when a delta time is set to 50 ms, and $T_{int}$ and $N_{int}$ may be set to 17 ms, and 3, respectively. However, a third timer interval may need to be adjusted to 16 ms, and when the third interval is terminated, the interval may need to be adjusted to 17 ms. Accordingly, even when an accumulation error occurs, the delta time may be partly corrected without error. When an accumulation error is actually within a value $T_{allow}$ of an allowable range, correction may not be performed. In other words, when an absolute value of the accumulation error $T_{diff}$ is less than the value $T_{allow}$, correction may not be performed.

---

Hereinafter, the above process will be described.
Initialization
Set $C_{nt}$ to 0 // $C_{nt}$ denoting number of timer interrupts
Set $M_{int}$ to 0 // $M_{int}$ denoting dummy variable of $N_{int}$
Appropriately set $T_{int}$ using delta time and $N_{int}$
Store current time in reference time $T_{ref}$
Set $T_{diff}$ to 0 // $T_{diff}$ = current_Time − ($T_{ref}$ + cnt * $T_{int}$), actual error
set_timer( $T_{int}$ ) // Call function to set timer interrupt to occur at intervals of $T_{int}$
Set state to 0 // State divided into normal state (0), correction state (1)
Call delta time-based component scheduling routine
Timer interrupt routine
if ( state = 0) {
cnt = cnt + 1 ;
$M_{int}$ = $M_{int}$ + 1 ;
Store current time in current_Time
$T_{diff}$ = current_Time − ($T_{ref}$ + cnt * $T_{int}$) ;
if ( Absolute value of $T_{diff}$ >= $T_{allow}$ ) {
set_timer($T_{int}$ − (Integer of $T_{diff}$)) ;
state = 1 ;
}
}
else { // state = 1, Set interrupt to original time interval after correction of timer
Set cnt to 0
state = 0 ;
$M_{int}$ = $M_{int}$ + 1 ;
Store current time in reference time $T_{ref}$
set_timer( $T_{int}$ )
}
if($M_{int}$ = $N_{int}$ ) {
$M_{int}$ = 0 ; // Start of delta period
Call delta time-based component scheduling routine
}

---

FIG. 10 is a flowchart illustrating a component scheduling method performed by a component scheduling apparatus according to yet another embodiment of the present invention.

Referring to FIG. 10, in operation 1001, the component scheduling apparatus may receive a plurality of components that are identified by a time period and a precedence relation.

For example, the component scheduling apparatus may receive a component list. The component list may include the plurality of components, a time period of each of the components, and a precedence relation between the components.

The precedence relation may be information indicating which component needs to be processed earlier than the other components. Accordingly, the component scheduling apparatus may determine a priority of each of the components, based on the precedence relation.

For example, components 1 to 4 may have a precedence relation in which the component 3 precedes the component 1, the components 3 and 4 precede the component 2, and the component 3 precedes the component 4. In other words, based on the precedence relation between the components 1 to 4, the component scheduling apparatus may verify that the component 3 needs to be executed prior to the component 1, that the components 3 and 4 needs to be executed prior to the component 2, and that the component 3 needs to be executed prior to the component 4. Accordingly, the component scheduling apparatus may assign a first highest priority to the component 3, assign a second highest priority to the component 4, assign a third highest priority to the component 2, and assign a lowest priority to the component 1. The component scheduling apparatus may align the components based on the priorities. For example, the component scheduling apparatus may align components in a descending order or in an ascending order.

In operation 1002, the component scheduling apparatus may calculate a delta time of each of the components. The component scheduling apparatus may calculate a delta time of each of the components, using a time period of each of the components. The delta time may refer to an amount of time during which a component is executed up to a deadline of the component, and the deadline of the component may refer to an end of a time period of the component. For example, when a time period of a component 1 is set to 50 ms, a deadline of the component 1 may be 50 ms, since the component 1 needs to be executed every 50 ms.

For example, the component scheduling apparatus may calculate a delta time of a component corresponding to a current ranking, based on a time period of the component corresponding to the current ranking, and based on a delta time of a component corresponding to a previous ranking. In this instance, the component corresponding to the current ranking may refer to a component targeted for calculation of a delta time, and the component corresponding to the previous ranking may refer to a component that is executed, or that needs to be executed prior to the component corresponding to the current ranking based on the time period and the precedence relation.

$$\Delta_k = p_k - \Sigma i < k(\Delta_i) \quad \text{[Equation 10]}$$

In Equation 10, when a component corresponding to a current ranking is represented by k, $p_k$ may denote a time period of the component k, and $\Delta_i$ may denote a delta time of a component corresponding to a previous ranking. Based on Equation 10, the component scheduling apparatus may calculate a delta time of the component k, by subtracting, from the time period $p_k$, a sum of delta times of components corresponding to previous rankings.

For example, when a time period of a component 1 is set to 50 ms, and when a time period of a component 2 is set to 100 ms; the component scheduling apparatus may calculate a delta time of the component 1 to be 50 ms, by subtracting a sum of delta times, namely 0, from the time period of 50 ms. In this instance, since the component 1 is a start component, there is no component prior to the component 1, and a sum of delta times of components corresponding to previous rankings may be 0.

Additionally, the component scheduling apparatus may calculate a delta time of the component 2 to be 50 ms, by subtracting, from the time period of 100 ms, a sum of delta times of components corresponding to previous rankings, namely 50 ms. In this instance, since only the component 1 precedes the component 2, the sum of delta times may be equal to the delta time of the component 1.

When a delta time of each of the components is calculated, the component scheduling apparatus may select components with the same time period from among the components that are included in the component list, and may assign the selected components to a single executor. In other words, the component scheduling apparatus may form a single component set including the selected components, and may process the component set using the executor.

In operation 1003, the component scheduling apparatus may assign the plurality of components to an execution queue, using the delta time of each of the components, and a priority based on the precedence relation.

In operation 1004, the component scheduling apparatus may execute all of the components assigned to the execution queue. In this instance, the component scheduling apparatus may execute the components during a predetermined time slot, based on the delta time. The predetermined time slot may be obtained by dividing the delta time.

For example, when a delta time of a component 1 is set to 50 ms, and when execution of the component 1 is started at a time slot of 0 ms, the component scheduling apparatus may execute the component 1 until the time slot reaches the delta time of 50 ms. In this instance, when a time period of the component 1 is set to 50 ms, the execution of the component 1 may be completed when the time slot reaches the delta time of 50 ms. Subsequently, the component scheduling apparatus may assign the completely executed component 1 to a finish queue.

Figure 11:
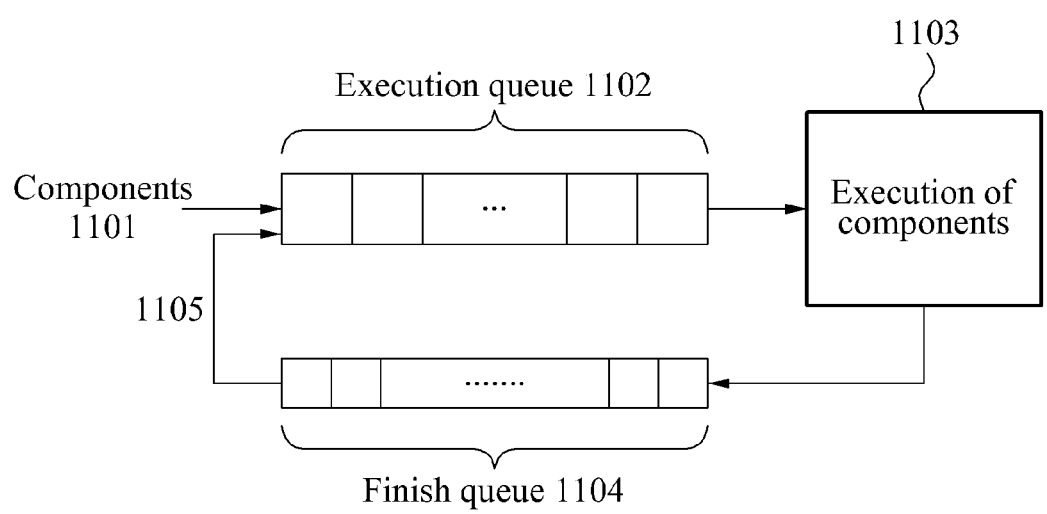
FIG. 11 is a diagram illustrating an operation of assigning components to an execution queue in a component scheduling apparatus according to yet another embodiment of the present invention.

FIG. 11 is a diagram illustrating an operation of assigning components to an execution queue in a component scheduling apparatus according to yet another embodiment of the present invention.

Referring to FIG. 11, the component scheduling apparatus may assign components 1101 to an execution queue 1102. A delta time of each of the components 1101 may be calculated. In this instance, the component scheduling apparatus may assign the components 1101 to the execution queue 1102, based on a priority and delta time of each of the components 1101.

Additionally, the component scheduling apparatus may execute the components 1101 assigned to the execution queue 1102 in operation 1103. In this instance, the component scheduling apparatus may re-assign, to a finish queue 1104, at least one component that is completely executed using the execution queue 1102. For example, the component scheduling apparatus may compare a period and delta time of the component assigned to the finish queue 1104, and may re-assign, to the execution queue 1102, the component assigned to the finish queue 1104 in operation 1105.

Figure 13A:
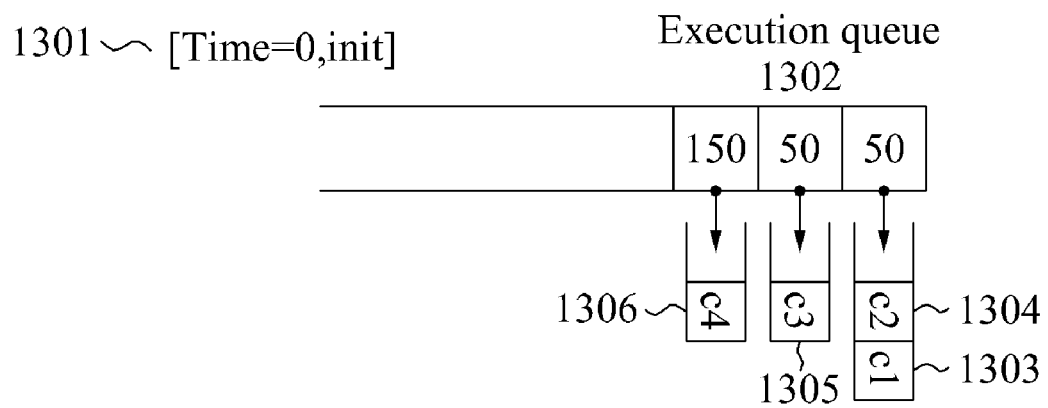
FIGS. 13A through 13C are diagrams illustrating an operation of scheduling components based on delta times in a component scheduling apparatus according to yet another embodiment of the present invention.

For example, referring to FIG. 13A, when periods of components 1303 to 1306 are set to 50 ms, 50 ms, 100 ms, and 250 ms, respectively, and when priorities are assigned to the components 1303 to 1306 in a descending order, the component scheduling apparatus may calculate delta times of the components 1303 to 1306 to be 50 ms, 50 ms, 50 ms, and 150 ms, respectively, using the above-described Equation 10.

Additionally, the component scheduling apparatus may arrange the components 1303 to 1306 in an execution queue 1302, horizontally in an order from a shortest delta time to a longest delta time, and may arrange the components 1303 to 1306 in the execution queue 1302, vertically in an order from a highest priority to a lowest priority, as shown in FIG. 13A. Specifically, the component scheduling apparatus may horizontally arrange the components 1304 to 1306 in the execution queue 1302, based on the delta times. Additionally, the component scheduling apparatus may vertically arrange the component 1303 with the highest priority and the component 1304 with the second highest priority in the execution queue 1302. In this instance, since the components 1303 and 1304 have the same time period of 50 ms, the component scheduling apparatus may form a component set including the components 1303 and 1304, and may assign the component set to a single executor.

The component scheduling apparatus may execute all of the components 1303 to 1306 assigned to the execution queue 1302. In a case 1301 of a time slot of 0 ms, the component scheduling apparatus may start execution of the components 1303 to 1306, and may continue to execute the components 1303 to 1306 until the time slot reaches 50 ms indicating the delta times of the components 1303 and 1304. When the time slot reaches 50 ms, the execution of the components 1303 and 1304 with the time period of 50 ms may be completed.

Figure 13B:
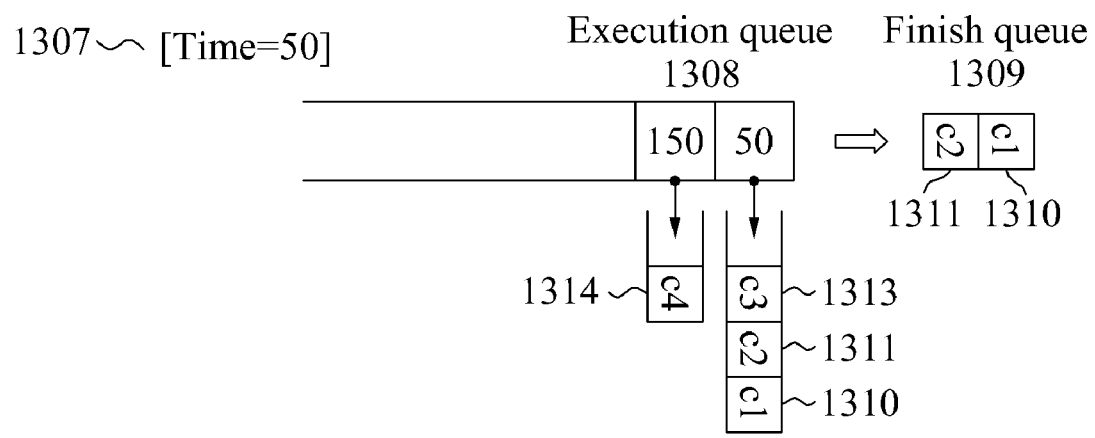

In a case 1307 of a time slot of 50 ms in FIG. 13B, the component scheduling apparatus may assign components 1310 and 1311 to a finish queue 1309. Specifically, when the time slot is changed from 0 ms to 50 ms, the component scheduling apparatus may move the components 1303 and 1304 from the execution queue 1302 to the finish queue 1309.

Additionally, the component scheduling apparatus may compare a time period of a component assigned to the finish queue with a delta time of a component assigned to the execution queue, and may re-assign, to the execution queue, the component assigned to the finish queue. Subsequently, the component scheduling apparatus may execute the component re-assigned to the execution queue. Additionally, the component scheduling apparatus may repeat an operation of assigning, to the finish queue, at least one component that is completely executed, and of re-assigning, to the execution queue, the at least one component assigned to the finish queue. Hereinafter, an operation of re-assigning components to an execution queue will be further described with reference to FIG. 12.

Figure 12:
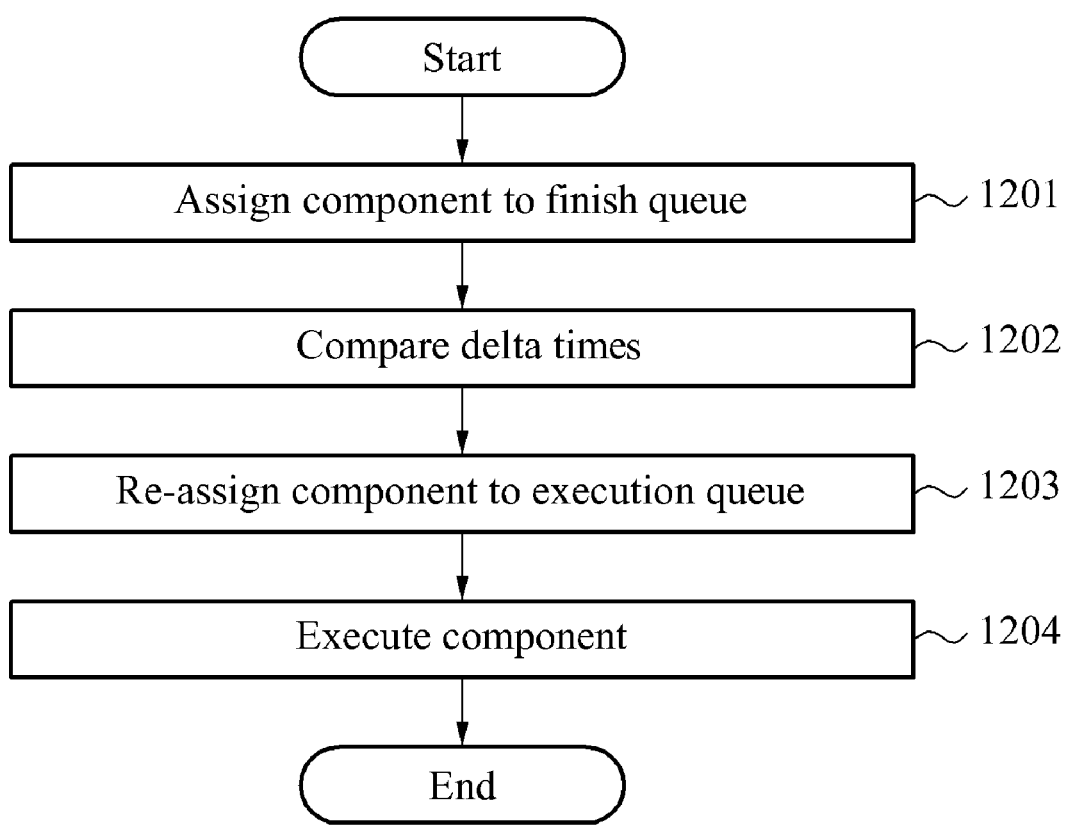
FIG. 12 is a flowchart illustrating an operation of re-assigning components to an execution queue in a component scheduling apparatus according to yet another embodiment of the present invention.

FIG. 12 is a flowchart illustrating an operation of re-assigning components to an execution queue in a component scheduling apparatus according to yet another embodiment of the present invention.

In operation 1201, the component scheduling apparatus may assign, to a finish queue, at least one component that is completely executed using an execution queue.

In operation 1202, the component scheduling apparatus may compare delta times of components assigned to the finish queue.

For example, referring to FIG. 13B, in the case 1307 of the time slot of 50 ms, the component scheduling apparatus may assign, to the finish queue 1309, the components 1310 and 1311 that are completely executed. Additionally, the component scheduling apparatus may compare a time period of the component 1311 assigned to the finish queue 1309 with a delta time of a component 1313 remaining in an execution queue 1308. In this instance, the component scheduling apparatus may perform the comparing, based on priorities of the components 1310 and 1311 assigned to the finish queue 1309. For example, the component scheduling apparatus may compare the delta time of the component 1313 in a head of the execution queue 1308, with the time period of the component 1311 in an end of the finish queue 1309, with respect to all the components 1310 and 1311 assigned to the finish queue 1309.

In operation 1203, the component scheduling apparatus may re-assign, to the execution queue, the component assigned to the finish queue, based on a result of comparing a time period of the component assigned to the finish queue with a delta time of a component assigned to the execution queue. In this instance, the component scheduling apparatus may re-assign, to the execution queue, a component with a time period equal to or less than the delta time of the component assigned to the execution queue among the at least one component assigned to the finish queue.

For example, when the time period of the component 1311 is equal to or less than the delta time of the component 1313; the component scheduling apparatus may re-assign, to the execution queue 1308, the component 1311 assigned to the finish queue 1309. Similarly, when a time period of the component 1310 is equal to or less than the delta time of the component 1313, the component scheduling apparatus may re-assign, to the execution queue 1308, the component 1310 assigned to the finish queue 1309. Accordingly, the components 1310, 1311, and 1313 may be located in the head of the execution queue 1308, as shown in FIG. 13B.

In operation 1204, the component scheduling apparatus may execute the component re-assigned to the execution queue during a predetermined time slot.

For example, in the case 1307 of the time slot of 50 ms in FIG. 13B, the component scheduling apparatus may execute all of the components 1310 to 1314 assigned to the execution queue 1308 during 50 ms, namely, a deadline of the components 1310 to 1313 in the head of the execution queue 1308. In other words, until the time slot is changed from 50 ms to 100 ms, the component scheduling apparatus may execute the components 1310 to 1314.

As described above with reference to FIG. 12, the component scheduling apparatus may repeat an operation of assigning, to the finish queue, at least one component that is completely executed using the execution queue, of re-assigning, to the execution queue, the at least one component assigned to the finish queue, and of executing the at least one component re-assigned to the execution queue.

Figure 13C:
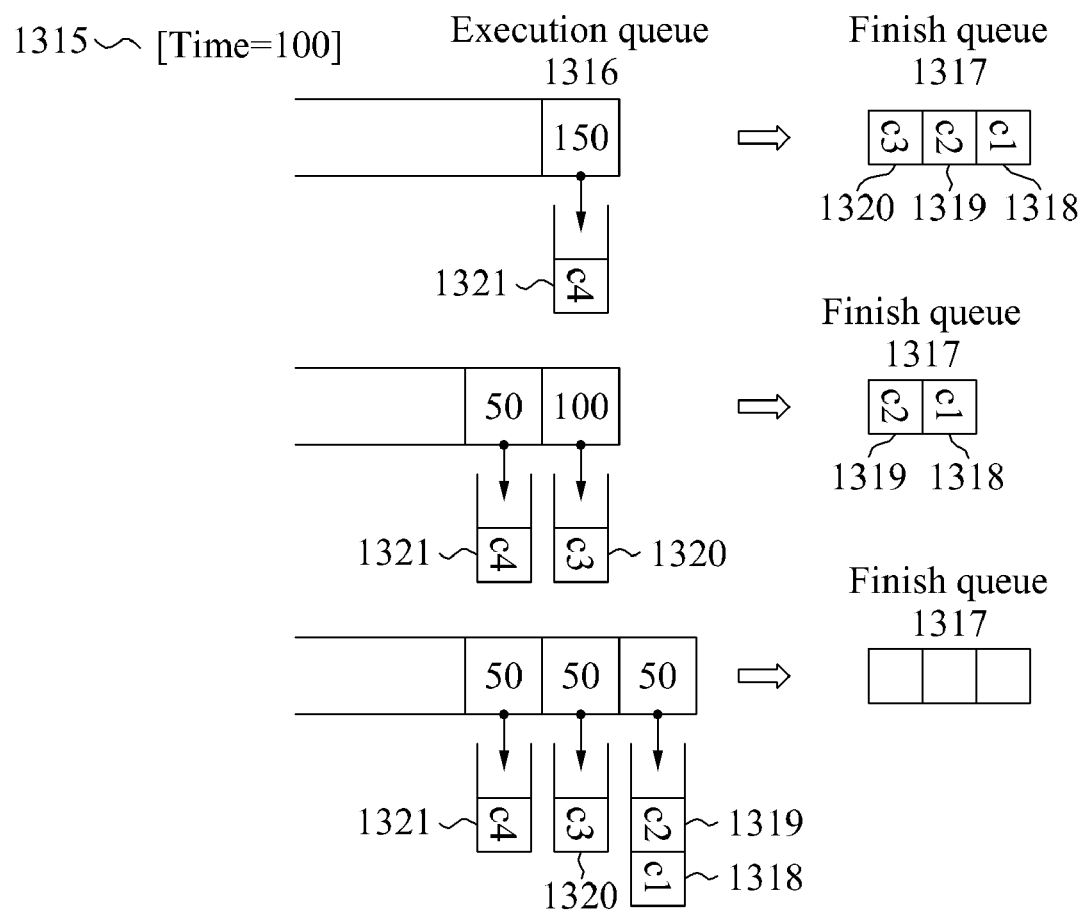

Referring to FIG. 13C, in a case 1315 of a time slot of 100 ms, when a component 1321 remains in an execution queue 1316, and when components 1318, 1319, and 1320 remain in a finish queue 1317, the component scheduling apparatus may compare a time period of the component 1320 assigned to an end of the finish queue 1317, with a delta time of the component 1321 in a head of the execution queue 1316. When the time period of the component 1320 is equal to or less than the delta time of the component 1321, the component scheduling apparatus may re-assign the component 1320 to the execution queue 1316, so that the component 1320 may be located in the head of the execution queue 1316.

Subsequently, the component scheduling apparatus may re-calculate a delta time of the component 1320, based on the above-described Equation 1. Since a component preceding the component 1320 does not exist, the component scheduling apparatus may re-calculate the delta time of the component 1320 to be 100 ms. Additionally, the component scheduling apparatus may compare time periods of the components 1318 and 1319, with the delta time of the component 1320 in the head of the execution queue 1316, and may re-assign, to the execution queue 1316, the components 1318 and 1319, based on a result of the comparing. Since the delta time of the component 1320 is greater than the time periods of the components 1318 and 1319, the component scheduling apparatus may arrange the components 1318 and 1319 in the head of the execution queue 1316. As described above, the component scheduling apparatus may re-assign, to the execution queue, components assigned to the finish queue, and may re-arrange the re-assigned components and components remaining in the execution queue.

For example, in a time slot of 150 ms, the component scheduling apparatus may assign, to a finish queue, components 1 and 2 that are completely executed, and may re-assign, to an execution queue, the components 1 and 2 assigned to the finish queue. Since time periods of the components 1 and 2 are equal to a delta time of a component 3 remaining in a head of the execution queue, the component scheduling apparatus may arrange the components 1 to 3 in the head of the execution queue, based on priorities of the components 1 to 3.

As described above, the component scheduling apparatus may execute a component assigned to an execution queue during a time slot, and may re-assign the component to the execution queue. When the re-assigned component is executed during a next time slot, the component scheduling apparatus may re-calculate a delta time of a component assigned to the execution queue every time the component is re-assigned, and may re-arrange components in the execution queue based on the delta time and priority. In other words, the component scheduling apparatus may dynamically schedule components every time the components are re-assigned to the execution queue.

Figure 14:
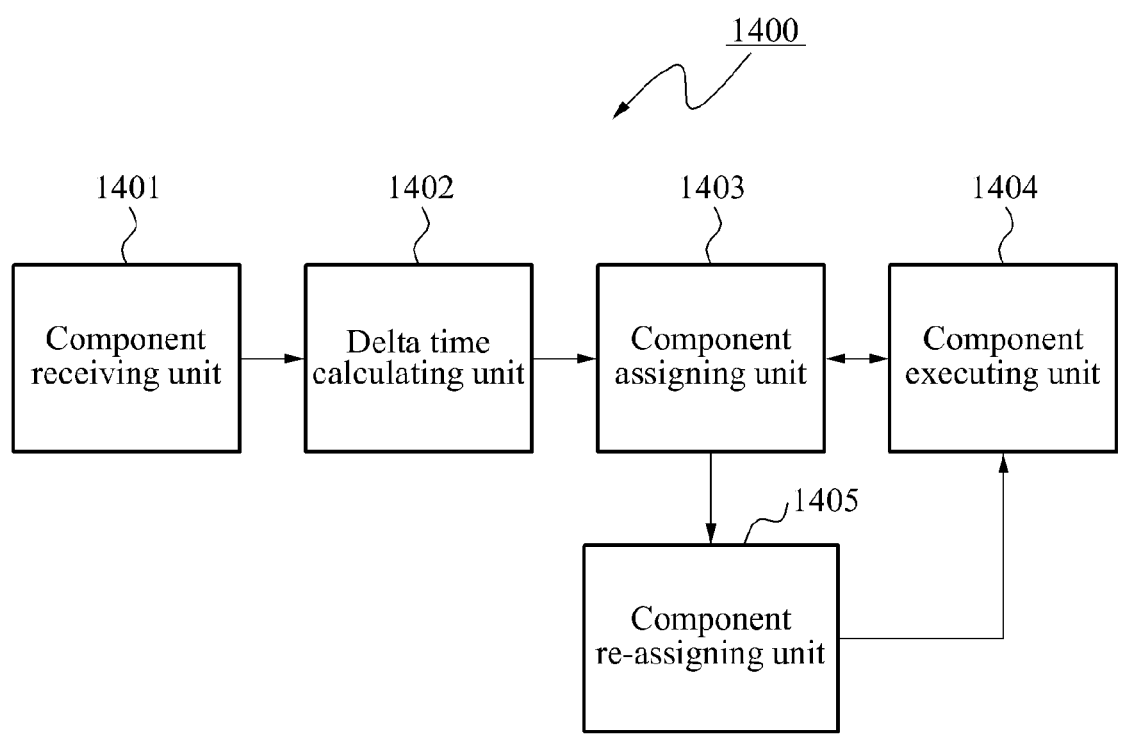
FIG. 14 is a block diagram illustrating a configuration of a component scheduling apparatus according to yet another embodiment of the present invention.

FIG. 14 is a block diagram illustrating a configuration of a component scheduling apparatus 1400 according to yet another embodiment of the present invention.

Referring to FIG. 14, the component scheduling apparatus 1400 may include a component receiving unit 1401, a delta time calculating unit 1402, a component assigning unit 1403, a component executing unit 1404, and a component re-assigning unit 1405.

The component receiving unit 1401 may receive a plurality of components that are identified by a time period and a precedence relation. In this instance, a component may refer to a software module in a robot system, and may include a task executed by the robot system.

For example, the component receiving unit 1401 may receive a component list. The component list may include a plurality of components desired to be executed, a time period of each of the components, and a precedence relation between the components. The precedence relation may be information indicating which component needs to be executed earlier than the other components, and may include information on a component that needs to be executed earlier than a current component.

The component receiving unit 1401 may determine a priority of each of the components included in the component list, based on the precedence relation between the components.

The delta time calculating unit 1402 may calculate a delta time of each of the components, using a time period of each of the components.

Based on the above-described Equation 10, the delta time calculating unit 1402 may calculate a delta time of a component corresponding to a current ranking, based on a time period of the component corresponding to the current ranking, and based on a delta time of a component corresponding to a previous ranking.

The component assigning unit 1403 may assign the components to an execution queue, based on the delta time and the priority. Additionally, the component assigning unit 1403 may form a component set including components with the same time period, and may assign the component set to a single executor.

For example, the component assigning unit 1403 may assign components horizontally from a head of the execution queue, in an order from a shortest delta time to a longest delta time. When a plurality of components are assigned to the head of the execution queue, the component assigning unit 1403 may enable the components in the head of the execution queue to be arranged vertically based on priorities of the components.

The component executing unit 1404 may execute the components assigned to the execution queue.

Specifically, the component executing unit 1404 may execute the components during a predetermined time slot, based on the delta times. For example, a delta time of at least one component in the head of the execution queue corresponds to 50 ms, the component executing unit 1404 may execute the at least one component assigned to the execution queue until a time slot is changed from 0 ms and 50 ms. Additionally, the component executing unit 1404 may execute components based on priorities of the components that are determined based on the precedence relation.

The component assigning unit 1403 may assign, to a finish queue, at least one component that is completely executed using the execution queue.

For example, when components 1 and 2 with a time period of 50 ms, and a component 3 with a time period of 100 ms are executed in a time slot of 0 ms, and when the time slot of 0 ms reaches 50 ms, execution of the components 1 and 2 may be completed. Subsequently, the component assigning unit 1403 may assign, to the finish queue, the components 1 and 2 that are completely executed. In this instance, the component 3 may remain in the execution queue. Additionally, the component assigning unit 1403 may assign components to the finish queue, based on priorities of the components. When a priority of the component 1 is higher than a priority of the component 2, the component assigning unit 1403 may assign the component 1 to the head of the finish queue, and may assign the component 2 to be located next to the component 1.

The component re-assigning unit 1405 may compare a time period of a component assigned to the finish queue, with a delta time of a component assigned to the execution queue. Based on a result of the comparing, the component re-assigning unit 1405 may re-assign, to the execution queue, the component assigned to the finish queue.

Additionally, the component re-assigning unit 1405 may re-assign, to the execution queue, a component with a time period equal to or less than the delta time of the component assigned to the execution queue among the at least one component assigned to the finish queue.

In an example, the component re-assigning unit 1405 may compare a delta time of a component 3 with a time period of a component 2 located in an end of a finish queue. When the time period of the component 2 is equal to or less than the delta time of the component 3, the component re-assigning unit 1405 may re-assign the component 2 to the execution queue. When a priority of the component 2 is higher than a priority of the component 3, the component re-assigning unit 1405 may re-assign the component 2 to the execution queue, so that the component 2 may be located ahead of the component 3 vertically in the execution queue. Similarly, the component re-assigning unit 1405 may re-assign a component 1 to the execution queue.

In another example, the component re-assigning unit 1405 may compare a delta time of a component 3 with time periods of components 1 and 2 assigned to a finish queue. Additionally, the component re-assigning unit 1405 may re-assign, to an execution queue, a component with a time period equal to or less than a delta time, based on a priority of each of components. For example, when the time periods of components 1 and 2 are less than the delta time of the component 3, when a priority of the component 1 is higher than a priority of the component 2, and when the priority of the component 2 is higher than a priority of the component 3, the component re-assigning unit 1405 may re-assign, to the execution queue, the components 1 and 2, so that the components 3, 2, 1 may be arranged vertically in the execution queue.

The component executing unit 1404 may execute the components assigned to the execution queue during a time slot. For example, when execution of components 1, 2 and 3 in a head of an execution queue is started at a time slot of 50 ms, and when a delta time corresponds to 50 ms, the component executing unit 1404 may execute the components 1 to 3 in the execution queue, until the time slot reaches 100 ms.

The above-described component scheduling may be performed by a single timer. For example, in an OPRoS component engine, a plurality of components may be executed using a single timer corresponding to a plurality of executors assigned to execute the plurality of components. In other words, the component scheduling apparatus may execute the plurality of components assigned to the plurality of executors using a single timer, instead of including a plurality of timers corresponding to the plurality of executors.

Hereinafter, a performance of the component scheduling apparatus in terms of an overhead, a jitter, and a propagation delay, in an example of scheduling components using a single timer will be described.

First, the performance of component scheduling apparatus may be evaluated in a simulation environment based on Table 5 below.

TABLE 5

| Parameter | Value |
| --- | --- |
| OS. | Microsoft Windows XP Professional SP3 |
| Component execution engine | OPRoS Component Engine v.20101130 |
| CPU | Intel ® Core ™2 Duo CPU E6750 @ 2.66 GHz |
| RAM | DDRII 2GB |

Additionally, the performance of the component scheduling apparatus may be evaluated on assumption that time periods of components 1 and 3 are set to 50 ms, and that time periods of components 2 and 4 are respectively set to 100 ms and 200 ms. The component scheduling apparatus may schedule components using a single thread.

When components are scheduled in the simulation environment of Table 5, results for the overhead, the jitter, and the propagation delay may be shown as in Table 6 below.

TABLE 6

| Engine | Overhead (us) | | Jitter (us) | | Propagation Delay (us) | | |
| --- | --- | --- | --- | --- | --- | --- | --- |
| | average | maximum | average | maximum | average | maximum | minimum |
| Original scheduling | 105 | 1 939 | 542 613 | 1 082 794 | 146 424 | 146 504 | 146 383 |
| Δtime scheduling | 1.4 | 82 | 528 | 1 795 | 6 014 | 6 055 | 6 012 |

In Table 6, 'original scheduling' indicates scheduling using an existing OPRoS execution engine, and 'Δtime scheduling' indicates an example of a component scheduling method according to embodiments of the present invention.

Table 6 shows that the Δtime scheduling greatly reduced the overhead, the jitter, and the propagation delay, compared to the original scheduling. In other words, the Δtime scheduling may improve a performance of a system, compared to the original scheduling.

The overhead, the jitter, and the propagation delay of Table 6 may be evaluated using Equations 11 to 13 below.

The jitter may be evaluated using Equation 11. In this instance, the jitter refers to a time during which execution of a component is delayed.

$$\text{Jitter}_j = t^{*}_{i,j} - j^{*}\text{period}_{i,j} \quad \text{[Equation 11]}$$

In Equation 11, $t^{*}_{i,j}$ denotes a time at which the execution of the component is started, and $\text{period}_{i,j}$ denotes a time period in which an i-th component is executed j times.

Additionally, the overhead may be evaluated using the following Equation 12:

$$\text{Overhead}_j = t^{f}_{i,j} - t^{s}_{i,j} \quad \text{[Equation 12]}$$

In Equation 12, $t^{s}_{i,j}$ denotes a time at which the execution of the component is started, and $t^{f}_{i,j}$ denotes a time at which the execution of the component is finished.

Furthermore, the propagation delay may be evaluated using the following Equation 13:

$$\text{PropagationDelay}_j = \text{endReceiver}_j - \text{StartSender}_j \quad \text{[Equation 13]}$$

In Equation 13, $\text{endReceiver}_j$ denotes a last component, and $\text{StartSender}_j$ denotes a first component. The propagation delay may refer to an amount of time required to obtain data corresponding to all components in an application.

As described above, in a component scheduling method and apparatus according to yet another embodiment of the present invention, it is possible to satisfy real-time characteristics by dynamically scheduling components, based on a precedence relation between the components, and a delta time of each of the components. Additionally, it is possible to prevent a time period of each of components from being missed, by preventing an increase in jitter by adjusting a timer. Thus, it is possible to improve a performance of an application sensitive to data.

The methods according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of performing a scheduling algorithm in a system used to execute a plurality of periodic tasks and at least one aperiodic real-time task, the method comprising:
   scheduling the periodic tasks based on a precedence relation between the periodic tasks; and
   scheduling the aperiodic real-time task for a residual time, when a request to schedule the aperiodic real-time task is received from the system, the residual time being left after the scheduling of the periodic tasks, wherein the scheduling of the periodic tasks comprises:
   repeatedly deleting periodic tasks corresponding to vertices with an indegree of 0 in a graph structure, from among the periodic tasks;
   topologically sorting the deleted periodic tasks in an order in which the periodic tasks are deleted, and assigning priorities to the periodic tasks; and
   scheduling the periodic tasks based on the assigned priorities.

2. The method of claim 1, wherein the repeatedly deleting comprises, when a plurality of periodic tasks correspond to the vertices with the indegree of 0, comparing periods of the plurality of periodic tasks, and deleting a periodic task with a shorter period than the other periods, based on a result of the comparing.

3. The method of claim 1, further comprising:
   allowing an execution of the aperiodic real-time task requested to be scheduled, depending on whether the residual time is longer than an execution time of the aperiodic real-time task.

4. The method of claim 3, further comprising:
   assigning a highest priority to the aperiodic real-time task, when the execution of the aperiodic real-time task is allowed;
   updating critical times of the periodic tasks; and
   when a critical time of a periodic task among the periodic tasks is approaching due to the updating, executing the periodic task earlier than the aperiodic real-time task.

5. The method of claim 3, wherein the executing of the periodic task comprises:
   assigning a lowest priority to the aperiodic real-time task;
   executing the periodic task; and
   re-assigning the highest priority to the aperiodic real-time task, when the executing of the periodic task is completed.

6. A scheduling apparatus in a system used to execute a plurality of periodic tasks and at least one aperiodic real-time task, the scheduling apparatus comprising:
   a processor;
   a periodic task scheduler to schedule, using the processor, the periodic tasks based on a precedence relation between the periodic tasks;
   a scheduling request receiver to receive, from the system, a request to schedule the aperiodic real-time task; and
   an aperiodic real-time task scheduler to schedule, using the processor, the aperiodic real-time task for a residual time left after the scheduling of the periodic tasks,
   wherein the periodic task scheduler repeatedly deletes periodic tasks corresponding to vertices with an indegree of 0 in a graph structure, from among the periodic tasks, topologically sorts the deleted periodic tasks in an order in which the periodic tasks are deleted, assigns priorities to the periodic tasks, and schedules the periodic tasks based on the assigned priorities.

* * * * *